Figure 1:
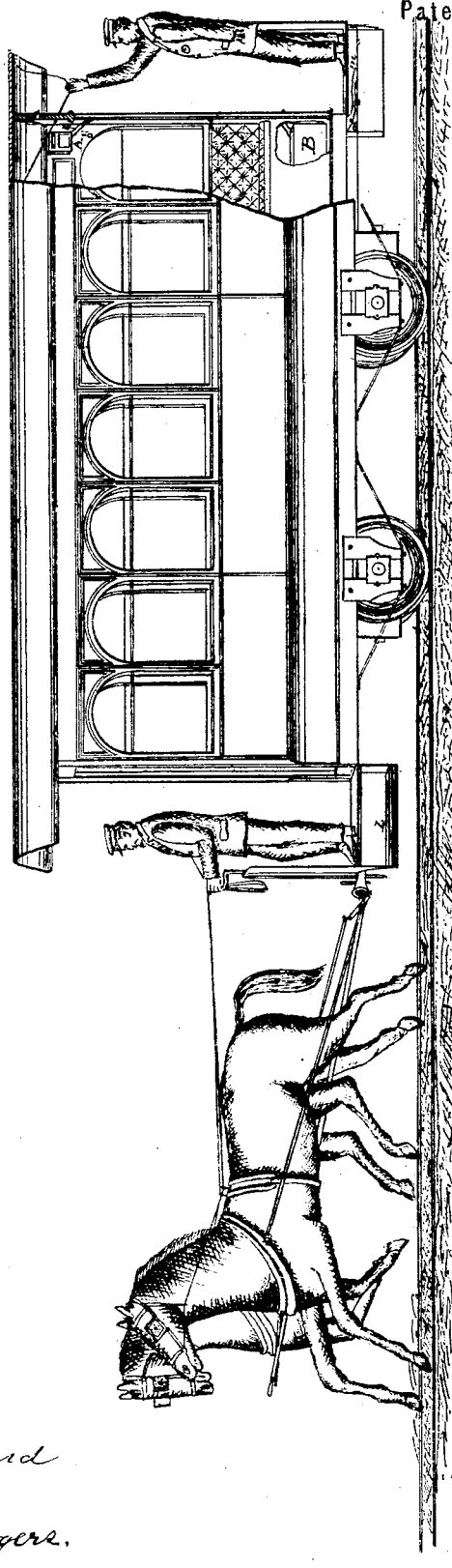

W. H. MUMLER.
Improvement in Electro-Magnetic Passenger-Registers for Street-Cars, &c.
No. 128,500. Patented July 2, 1872.

WITNESSES.
INVENTOR.

3 Sheets--Sheet 2.

W. H. MUMLER.
Improvement in Electro-Magnetic Passenger-Registers for Street-Cars, &c.
No. 128,500. Patented July 2, 1872.

WITNESSES. INVENTOR.
N. C. Lombard William H. Mumler
Frank H. Rogers

3 Sheets--Sheet 3.

W. H. MUMLER.
Improvement in Electro-Magnetic Passenger-Registers for Street-Cars, &c.
No. 128,500. Patented July 2, 1872.

WITNESSES.
N. C. Lombard
Frank H. Rogers

INVENTOR.
William H. Mumler

UNITED STATES PATENT OFFICE.

WILLIAM H. MUMLER, OF BOSTON, MASSACHUSETTS.

IMPROVEMENT IN ELECTRO-MAGNETIC PASSENGER-REGISTERS FOR STREET-CARS, &c.

Specification forming part of Letters Patent No. 128,500, dated July 2, 1872.

Specification describing a new and useful "Passenger-Register" for Horse-Cars and other vehicles, invented by WILLIAM H. MUMLER, of Boston, in the county of Suffolk and State of Massachusetts.

My invention relates to a device for registering the number of passengers that enter and leave a horse-car, omnibus, or other passenger vehicle by means of the weight of the person on the step; and it consists, first, in the application of an electro-galvanic battery to a horse-car or other vehicle, with suitable wires leading from said battery to a signal-box containing electro-magnets, and thence to the steps of the car, and connected to a suitable circuit-closer thereon. It also consists in the application, to a horse-car or other passenger-vehicle, of a movable step, so arranged and so combined with suitable wires leading to and from the opposite poles of a battery that the weight of a person standing on said step will close the circuit, and a spring under said step shall cause the circuit to be broken again when the weight is removed. It also consists in the use, in combination with a galvanic battery and wires leading from the opposite poles thereof to the steps of a passenger vehicle, of an electro-magnetic registering device for recording the number of passengers that enter and leave the said vehicle. It also consists in the combination, with an electro-magnet and its armature, of a ratchet-wheel and pawl and a numbered register-wheel or its equivalent, so arranged that each downward movement of the armature shall cause said register-wheel to advance half the distance between two contiguous numbers. It also consists in the combination, with said register-wheel, of a perforated plate or shield, so arranged as to determine the number to be read, as will be further described. It also consists in the combination of a series of said register-wheels and a corresponding number of electro-magnets, each connected to a step of the vehicle by suitable wires leading thereto and to a galvanic battery. It also consists in the combination, with an electro-galvanic registering device, so applied to a passenger vehicle that it may be controlled and operated by the weight of a person on the step, of a supplementary circuit for ringing a bell, said circuit being closed or broken by the movements of the armature of the magnet that operates the registering device.

Figure 3:
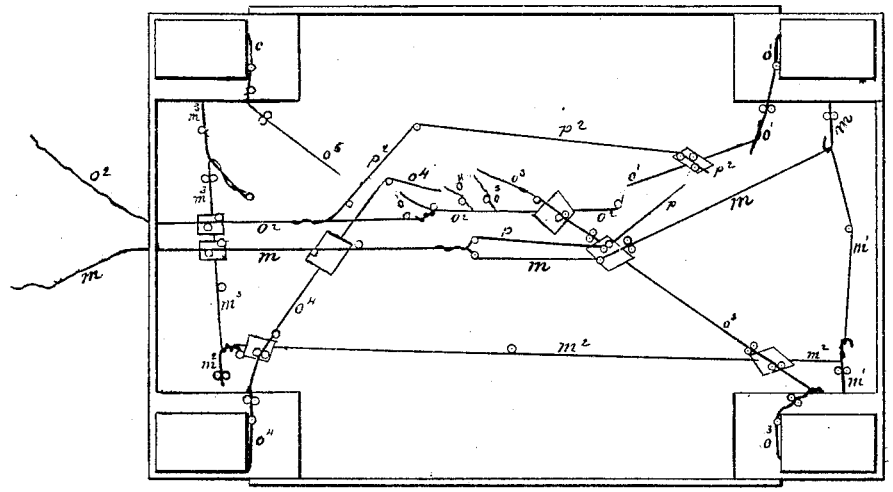
Figure 2:
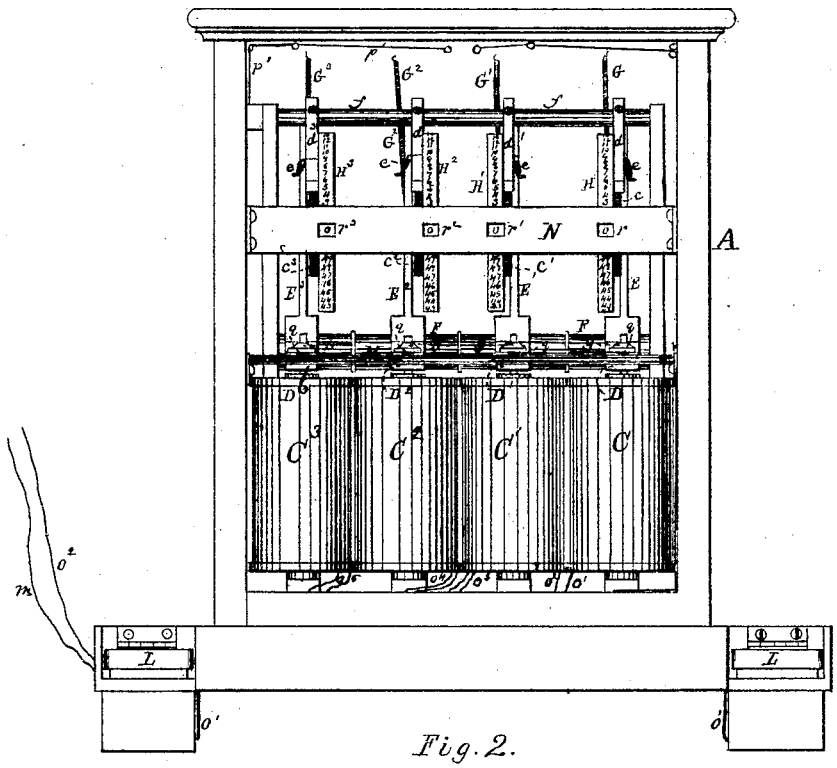
Figure 4:
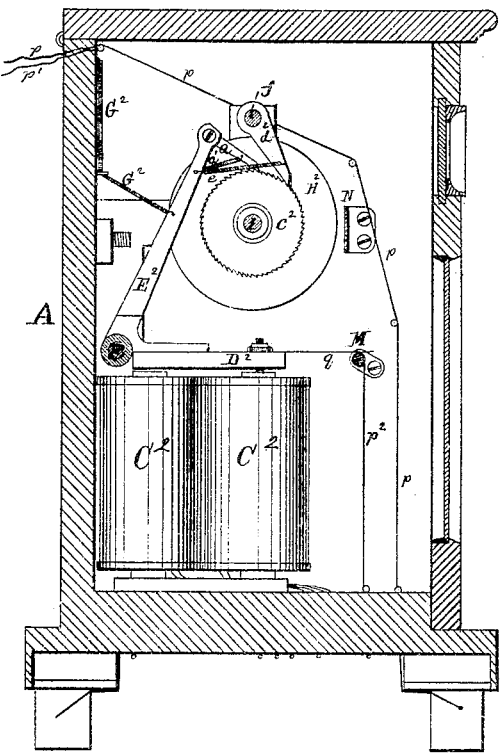
Figure 5:
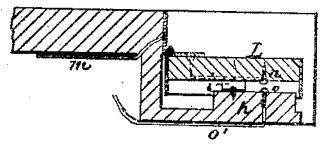

Figure 1 of the drawing is a perspective view of a horse-car with my improvement attached, a portion of the rear end of the car being cut in section in order to show the position of the battery and the signal-box. Fig. 2 is a front elevation of the signal-box with the door removed, said box being shown resting upon the sills of a car made to a much smaller scale and showing the manner of constructing the car-steps. Fig. 3 is a plan of the under side of Fig. 2. Fig. 4 is a vertical transverse section on line $x\ x$ on Fig. 2. Fig. 5 is a transverse section through one of the steps of the car.

A is the signal-box, and B is the battery, located in the car, as shown in Fig. 1. C, $C^1$, $C^2$, and $C^3$ are magnets, mounted in the usual manner, and arranged in the box A, as shown in Figs. 2 and 4. D, $D^1$, $D^2$, and $D^3$ are the armatures, attached to the short arms of the bell-crank levers E, $E^1$, $E^2$, and $E^3$, mounted upon the fulcrum-pin or rod F common to all, and carrying at their upper ends the pawls $a$. G, $G^1$, $G^2$, and $G^3$ are springs, which serve to draw back the long arms of the levers E, $E^1$, $E^2$, and $E^3$ when the circuit is broken, and thereby raise the armatures from the magnets. H, $H^1$, $H^2$, and $H^3$ are index or register wheels, mounted upon the fixed shafts I in such a manner that either of said wheels may revolve thereon while the others remain stationary; or, they may all move together, and having a series of numbers from 0 to 51 arranged consecutively on their outer peripheries in such a manner that the number of passengers that have entered or left the car upon the step that is connected to any particular magnet may be readily indicated by the number that stands at a given point, and by taking the numbers standing at a given point on all of the index-wheels and adding them together the whole number of the passengers that have entered the car since the registering device was adjusted may be determined. Each of the index-wheels, H, $H^1$, $H^2$, and $H^3$, have a ratchet-wheel, $c$, $c^1$, $c^2$, and $c^3$, secured thereto, by means of which and the pawl $a$ the index-wheel is made to move forward one notch of the ratchet-wheel at every downward movement of the armature, the stop-pawls $d$, $d^1$, $d^2$, and $d^3$ preventing the ratchet-wheel from moving backward when the pawl $a$ is drawn back over the teeth of the wheel. The pawls $d$, $d^1$, $d^2$, and $d^3$ are mounted on the rod $f$, and are kept in gear with the ratchet-wheels by the springs $e$, one end of which is attached to the pawl, and the other to the levers E, $E^1$, $E^2$, or $E^3$. The pawls $a$ are kept in gear with the ratchet-wheel by means of the springs $a'$ attached to the pawl and lever in the same manner as the spring $e$. The amount of movement of the armatures away from the magnet, and, consequently, the extent of backward movement of the pawl $a$, is regulated and controlled by the adjustable stops $g$. Each step, L, of the car or carriage is hung, by means of a hinge or its equivalent, a short distance above a fixed tread or platform, $h$, with the spring $i$ interposed between them so as to raise the step L above $h$ a sufficient distance to break the circuit of the wires, where it will remain until a passenger steps onto L and by his weight depresses it until it comes in contact with $h$, which causes the circuit of the wires to be closed, as will be presently described. A wire, $m$, leads from the positive pole of the battery to the hinge of the step L, from which a small wire—seen in dotted lines in Fig. 5—leads to the pin or button $n$ inserted in the under side of the step L, as shown. A corresponding pin or button, $o$, is inserted in the fixed step $h$ directly under $n$ in such a manner that when the step L is depressed by the weight of a person standing thereon it will cause said pin-heads or buttons to come in contact, and thereby close the circuit in an obvious manner. From the pin $o$ the wire $o^1$ leads to the register-box A, and, passing along and through the bottom thereof, is connected to one end of the coil of the magnet C. From the other end of the magnet C the wire $o^2$ passes through the bottom of the box A, and to and connects with the negative pole of the battery B located beneath the seat of the car. Branch wires $m^1$, $m^2$, and $m^3$ convey the current from $m$ to the other three steps, and corresponding return-wires $o^3$, $o^4$, and $o^5$ lead from the several steps to the magnets $C^1$, $C^2$, and $C^3$, and from said magnets to the wire $o^2$, and connect therewith. Another branch wire, $p$, leads from the wire $m$ to the interior of the box, and thence to and connecting with a magnet forming a part of a bell-ringing device, not shown in the drawing, but which may be placed in the register-box or outside thereof in any convenient location in the car. Another wire, $p^1$, leads from the other end of the coil of the magnet on the bell apparatus to and connects with some portion of the metallic frame-work in the register-box. A light metallic spring-finger, $q$, is attached to each of the armatures D, $D^1$, $D^2$, and $D^3$, and so arranged that when said armatures are drawn down they will come in contact with the metallic rod M, from which the wire $p^2$ leads to and connects with the wire $o^2$ leading to the negative pole of the battery, said spring-fingers $q$ serving the purpose of circuit-closers for the bell-circuit. N is a bar, secured by its two ends to the sides of the box A, and provided with openings $r$, $r^1$, $r^2$, and $r^3$ immediately in front of each index-wheel, and through which the numbers on said wheels may be read.

The operation of my improved device for registering the passengers that enter and leave a horse-car is as follows: Before the car starts on its trip all the index-wheels H, $H^1$, $H^2$, and $H^3$ are so adjusted that 0 thereon will be seen through the openings $r$, $r^1$, $r^2$, and $r^3$. When a passenger steps upon the hinged step L at either end or either side of the car the circuit is closed by the depression of the step L, causing the pins $n$ and $o$ to come in contact, and thus uniting the two wires leading therefrom to the two poles of the battery, and as one of said wires in its course connects with the coil of one of the magnets C, $C^1$, $C^2$, and $C^3$ the passage of the current of electricity through said coil will cause the magnet to attract its armature, and thereby cause the pawl $a$ to move the index-wheel forward a distance equal to one-half the distance between the numbers on the periphery of said wheels; and when a passenger leaves the car the connection is closed again, and by the same process the wheel is advanced the balance of the distance to bring the finger 1 before the opening in bar N. It is clear that every passenger that enters a car must leave it, and to enter and leave he will stand on the step twice, and consequently close the circuit and set the mechanism in the register-box in motion, and therefore it becomes necessary to arrange the mechanism so that each motion of the armature shall move the periphery of the index-wheel only half the distance from one number to the next, to do which it is only necessary to have twice the number of teeth on the ratchet-wheels $c$, $c^1$, $c^2$, and $c^3$ that there are numbers on the peripheries of the index-wheels H, $H^1$, $H^2$, and $H^3$. As each step of the car is provided with a circuit-closing device, and connected by suitable wires with the two poles of the battery, and with distinct and separate registering device, it follows that a passenger may enter or leave the car from either step, or passengers may enter or leave from all the steps at the same time without disarranging the registering apparatus, and each passenger will be registered; but no two passengers must be upon the step at the same time, and therefore it is contemplated to make the steps of such a size and form that only one person can enter or leave the car over the same step at the same time. The closing of the circuit by the depression of the steps L and the consequent movement of the armatures D, $D^1$, $D^2$, and $D^3$ closes the circuit of the bell-ringing apparatus and causes a bell to ring at the same time that the index-wheel is moved forward; and if the passenger remains on the step the bell will continue to ring, notifying the conductor that the step is blocked and should be cleared.

What I claim as new, and desire to secure by Letters Patent of the United States, is—

1. In combination with a passenger vehicle I claim an electro-magnetic registering apparatus, substantially as described.

2. The combination, with a horse-car or other passenger vehicle, of a battery and a registering mechanism located thereon having connecting-wires leading from said battery and registering mechanism to the steps of the car and a suitable circuit-closer to be operated by said steps, substantially as described.

3. In combination with an electro-magnetic apparatus for registering the number of passengers that enter and leave a car or other vehicle, I claim the hinged step L, arranged and operating to break and close the circuit, substantially as described.

4. In an apparatus for registering by electro-magnetism the number of passengers that enter or leave a car or other vehicle, I claim a register-box containing one or more magnets and one or more trains of mechanism so arranged that the attraction of an armature by its magnet will cause a register-wheel provided with a consecutive series of numbers, painted or otherwise affixed thereon, to move around its axis so as to present said numbers consecutively contiguous to a fixed indicator provided for the purpose, substantially as described.

5. In an electro-magnetic apparatus for registering the number of passengers that enter or leave a car or other vehicle, I claim a circuit-closer operated by the step of the car or vehicle, in combination with a means of closing the circuit of the bell-ringing apparatus by the movement of the armature in the registering device, arranged and operating substantially as described.

Executed at Boston this 9th day of May, 1872.

WILLIAM H. MUMLER.

Witnesses:
   N. C. LOMBARD,
   FRANK K. ROGERS.